(12) United States Patent
Oveyssi et al.

(10) Patent No.: US 6,462,914 B1
(45) Date of Patent: Oct. 8, 2002

(54) VOICE COIL MOTOR COMPRISING A VOICE COIL WRAPPED AROUND A ROTARY VOICE COIL YOKE COMPRISING A LOW RELUCTANCE END AND A HIGH RELUCTANCE END

(75) Inventors: Kamran Oveyssi; Shawn E. Casey, both of San Jose; Jason T. Weaver, Milpitas; Mitchell D. Dougherty, San Jose, all of CA (US)

(73) Assignee: Western Digital Technologies, Inc., Lake Forrest, CA (US)

( * ) Notice: Subject to any disclaimer, the term of this patent is extended or adjusted under 35 U.S.C. 154(b) by 128 days.

(21) Appl. No.: 09/704,188

(22) Filed: Oct. 31, 2000

(51) Int. Cl.[7] ................................................. G11B 5/55
(52) U.S. Cl. .................................... 360/264.8; 310/154
(58) Field of Search ........................ 360/264.8; 310/46, 310/154

(56) References Cited

U.S. PATENT DOCUMENTS

| | | | |
|---|---|---|---|
| 4,658,313 A | 4/1987 | Takahashi et al. | |
| 5,523,911 A | 6/1996 | Mita et al. | |
| 5,557,152 A | 9/1996 | Gauthier | |
| 5,698,911 A | * 12/1997 | Dunfield et al. | 360/264.8 |
| 5,808,838 A | 9/1998 | Battu et al. | |
| 5,818,667 A | 10/1998 | Larson | |
| 5,822,156 A | 10/1998 | Suzuki et al. | |
| 5,914,836 A | 6/1999 | Pottebaum | |
| 5,946,166 A | * 8/1999 | Ma et al. | 360/264.8 |
| 5,953,183 A | 9/1999 | Butler et al. | |
| 6,157,099 A | 12/2000 | Hartman | |

\* cited by examiner

Primary Examiner—Robert S. Tupper
(74) Attorney, Agent, or Firm—Milad G. Shara, Esq.

(57) ABSTRACT

The present invention may be regarded as a disk drive comprising a disk, an actuator arm comprising a head, and a voice coil motor for actuating the actuator arm to position the head radially over the disk. The voice coil motor comprises a first magnet for generating a first magnetic flux, and a rotary voice coil yoke comprising a magnetic flux conductor shaped to form an air gap with respect to the first magnet, the magnetic flux conductor comprising a first end having a first reluctance and a second end having a second reluctance, wherein the first reluctance is substantially lower than the second reluctance such that the magnetic flux conductor guides the first magnetic flux through the air gap and through the first end. A voice coil is wrapped around at least part of the magnetic flux conductor for conducting a current to generate a second magnetic flux such that at least part of the second magnetic flux is within the air gap for interacting with the first magnetic flux.

19 Claims, 9 Drawing Sheets

VOICE COIL MOTOR COMPRISING A VOICE COIL WRAPPED AROUND A ROTARY VOICE COIL YOKE COMPRISING A LOW RELUCTANCE END AND A HIGH RELUCTANCE END

CROSS REFERENCE TO RELATED APPLICATIONS AND PATENTS

This application is related to co-pending patent application Ser. No. 09/584,652 entitled "DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLUX" filed on May 30, 2000, the disclosure of which is incorporated herein by reference.

BACKGROUND OF THE INVENTION

1. Field of the Invention

The present invention relates to disk drives for computer systems. More particularly, the present invention relates to a disk drive employing a voice coil motor comprising a voice coil wrapped around a rotary voice coil yoke comprising a low reluctance end and a high reluctance end.

2. Description of the Prior Art

Referring to FIG. 1, a conventional disk drive typically comprises a disk 2 for storing data in a plurality of radially spaced, concentric tracks 4. A head 6 is actuated radially over the disk 2 in order to write data to or read data from a target track 4. The head 6 is typically attached to a suspension 8 which biases the head 6 toward the surface of the disk 2. The suspension 8 is attached to the distal end of an actuator arm 10 which is rotated about a pivot 12 by a voice coil motor 14. The disk 2 typically has recorded thereon embedded servo wedges 16 which store coarse and fine head position information for positioning the head 6 over a centerline of a target track 4.

As shown in FIG. 2A, a conventional voice coil motor 14 typically comprises a voice coil 18 in the shape of a trapezoid comprising a first side 20A opposite a second side 20B. A current is passed through the voice coil 18 to induce a first magnetic flux 22A and a second magnetic flux 22B along the length of each side (20A and 20B). Because the voice coil 18 is wound up one leg and down the other, the direction of the magnetic flux 22A induced along the first side 20A is opposite the direction of the magnetic flux 22B induced along the second side 20B. A first magnet 24A and a second magnet 24B induce respective magnetic fluxes into and out of the page which are orthogonal to the magnetic fluxes (22A and 22B) induced by the voice coil 18. The orthogonal magnetic fluxes induce a horizontal force on the voice coil 18, thereby rotating the actuator arm 10 about the pivot 12 to move the head 6 radially over the disk 2. The actuator arm's direction of rotation (clockwise or counter-clockwise) depends on the direction of the current passing through the voice coil 18 (clockwise or counter-clockwise). Thus, the direction of the head 6 is reversed by reversing the direction of the current passing through the voice coil 18.

Because the direction of the magnetic flux 22A induced along the first side 20A of the is voice coil 18 is opposite the direction of the magnetic flux 22B induced along the second side 20B, the first magnet 24A is magnetized from top to bottom with a magnetic polarity (N/S or S/N) that is opposite that of the second magnet 24B so that the magnetic fluxes 24A and 24B are aligned in the appropriate direction. In one embodiment, the first and second magnets (24A and 24B) are manufactured from separate pieces of magnetic material and then magnetized with the appropriate polarity N/S or S/N. In alternative embodiment, the first and second magnets (24A and 24B) are manufactured from a single piece of magnetic material and then magnetized with the appropriate polarity (N/S and S/N). Thus, the dashed line between the first and second magnets (24A and 24B) shown in FIG. 2 may represent a border between two separate pieces of magnet material, or a polarity border delineating two separate magnetized regions of a single piece of magnetic material.

The first and second magnets (24A and 24B) are housed within a rotary voice coil yoke 26, further details for which are illustrated in a perspective view in FIG. 2B and in a plane view in FIG. 2C. The yoke 26 comprises a top magnetic flux conductor 28A and a bottom magnetic flux conductor 28B. The first and second magnets (24A and 24B) are attached to an interior surface 30 of the top magnetic flux conductor 28A. The yoke 26 may further comprise a third magnet 32A and a forth magnet 32B attached to an interior surface 31 of the bottom magnetic flux conductor 28B. As shown in FIG. 2C, the top magnetic flux conductor 28A and the bottom magnetic flux conductor 28B form an air gap 34 between the magnets (24A, 24B, 32A and 32B). The polarity (N/S) of the magnets (24A, 24B, 32A and 32B) generates a multidirectional magnetic flux 36A and 36B with respect to the air gap 34. In the example shown in FIG. 2C, the direction of magnetic flux 36A is upward from magnet 32A to magnet 24A, and the direction of magnetic flux 36B is downward from magnet 24B to magnet 32B. The magnetic flux 36A interacts with the magnetic flux 22A of FIG. 2B generated by the first side 20A of the voice coil 18, and the magnetic flux 36B interacts with the magnetic flux 22B generated by the second side 20B of the voice coil 18.

There are drawbacks associated with the conventional rotary voice coil yoke design of FIGS. 2B and 2C. Namely, the magnets 24A, 24B, 32A and 32B represent a significant cost of the overall actuator assembly. In particular, the magnetic material itself is expensive and there is expense involved with magnetizing the magnetic material. In addition, the conventional two-piece yoke design increases the manufacturing cost of the disk drive due to the three step process required to manufacture the actuator assembly. First, the bottom magnetic flux conductor 28B is fastened to the base of the disk drive (e.g., glued or screwed down). Next, the actuator arm 10 is fastened onto the pivot 12 such that the voice coil 18 is positioned over the second and third magnet 32A and 32B. Finally, the top magnetic flux conductor 28A is fastened to the bottom magnetic flux conductor 28B (e.g., glued or screwed down) such that the first and second magnets 24A and 24B are positioned over the voice coil 18. This three step process increases the manufacturing time and therefore the manufacturing cost of the disk drive.

The cost of the rotary voice coil yoke design of FIGS. 2B and 2C can be reduced by eliminating the top magnets 24A and 24B or the bottom magnets 32A and 32B. However, the stray flux emanating from the top and bottom sides of the magnets interact with the top and bottom sides of the trapezoidal coil 18 shown in FIG. 2A which can excite resonances in the system leading to poor performance. Thus, the prior art typically employs top and bottom magnets so that the stray magnetic flux emanating from the top and bottom sides of the magnets is canceled.

It is also known to construct a voice coil motor by wrapping a voice coil around a middle conductor within a closed-ended yoke (low reluctance on both ends) comprising a top and bottom plate connected at the ends to form a closed housing for the middle conductor. This is illustrated in FIG. 3A which shows a top view of a closed-ended yoke 38 and a first and second voice coil 40A and 40B wrapped around a middle conductor 42. The first and second voice coils 40A and 40B are wrapped in opposite directions and magnets 44A and 44B are magnetized with opposite polarity. The construction of the closed-ended yoke 38 is similar to the yoke shown in FIG. 2A with the addition of a middle conductor 42 connected at both ends of the yoke within the housing. FIG. 3A also shows that two additional magnets 46A and 46B are attached to the back side of the closed-ended yoke 38 to generate flux which interacts with the back side of the voice coils 40A and 40B. A plane view of the closed-ended yoke 38 of FIG. 3A is shown in FIG. 3B. Only the first voice coil 40A is shown wrapped around the middle conductor 42. FIG. 3B also illustrates the bottom magnet 48A attached to the bottom plate of the closed-ended yoke 38.

With the closed-ended yoke structure of FIGS. 3A and 3B, guiding the magnetic flux through both ends of the yoke 38 increases the inductance of the voice coils 40A and 40B, thereby reducing performance of the voice coil motor by increasing the rise time of current through the voice coils 40A and 40B which in turn reduces the rise time of the magnetic flux induced by the voice coils 40A and 40B. More power is required to compensate for the increased inductance, which is less efficient.

There is, therefore, a need for a lower cost, more efficient voice coil motor for use in a disk drive.

SUMMARY OF THE INVENTION

The present invention may be regarded as a disk drive comprising a disk, an actuator arm comprising a head, and a voice coil motor for actuating the actuator arm to position the head radially over the disk. The voice coil motor comprises a first magnet for generating a first magnetic flux, and a rotary voice coil yoke comprising a magnetic flux conductor shaped to form an air gap with respect to the first magnet, the magnetic flux conductor comprising a first end having a first reluctance and a second end having a second reluctance, wherein the first reluctance is substantially lower than the second reluctance such that the magnetic flux conductor guides the first magnetic flux through the air gap and through the first end. A voice coil is wrapped around at least part of the magnetic flux conductor for conducting a current to generate a second magnetic flux such that at least part of the second magnetic flux is within the air gap for interacting with the first magnetic flux.

In one embodiment, the magnetic flux conductor comprises a substantially C shape It comprising a top prong and a bottom prong, and the voice coil is wrapped around the top prong of the C shape. In another embodiment, the voice coil is wrapped around the bottom prong. In yet another embodiment, the magnetic flux conductor comprises a substantially E shape comprising a top prong, a middle prong, and a bottom prong, and the voice coil is wrapped around the middle prong of the E shape. In still another embodiment, the voice coil motor comprises a second magnet for generating a second magnetic flux, the first magnet is attached to the top prong of the E shape, and the second magnet is attached to the bottom prong of the E shape.

The present invention may also be regarded as a rotary voice coil yoke for use in a voice coil motor. The rotary voice coil yoke comprising a magnetic flux conductor shaped to form an air gap with respect to a first magnet. The first magnet for generating a first magnetic flux, the magnetic flux conductor comprising a first end having a first reluctance and a second end having a second reluctance, wherein the first reluctance is substantially lower than the second reluctance such that the magnetic flux conductor guides the first magnetic flux through the air gap and through the first end.

DESCRIPTION OF THE PREFERRED EMBODIMENTS

Figure 4:
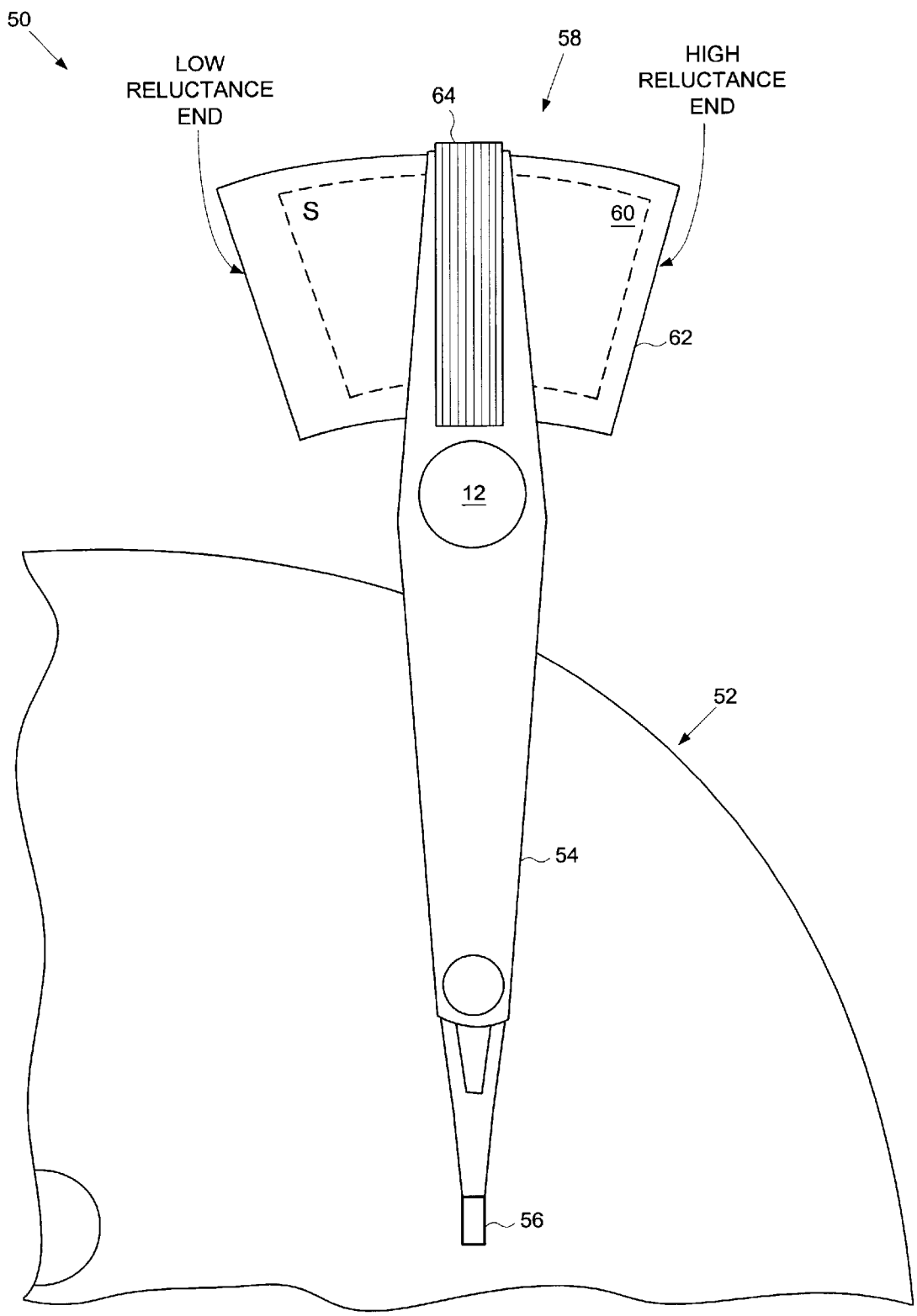
FIG. 4 shows a voice coil motor according to an embodiment of the present invention comprising a rotary voice coil yoke comprising a magnetic flux conductor shaped to form an air gap with respect to a magnet, the magnetic flux conductor comprising a first end having a first reluctance and a second end having a second reluctance, wherein the first reluctance is substantially lower than the second reluctance such that the magnetic flux conductor guides the first magnetic flux through the air gap and through the first end. A voice coil for conducting current to generate a second magnetic flux is wrapped around at least part of the magnetic flux conductor such that at least part of the second magnetic flux interacts with the first magnetic flux.

FIG. 4 shows a disk drive 50 according to an embodiment of the present invention as comprising a disk 52, an actuator arm 52 comprising a head 56, and a voice coil motor 58 for actuating the actuator arm 54 to position the head 56 radially over the disk 52. The voice coil motor 58 comprises a first magnet 60 for generating a first magnetic flux, and a rotary voice coil yoke comprising a magnetic flux conductor 62 shaped to form an air gap with respect to the first magnet 60, the magnetic flux conductor 62 comprising a first end having a first reluctance and a second end having a second reluctance, wherein the first reluctance is substantially lower than the second reluctance such that the magnetic flux conductor 62 guides the first magnetic flux through the air gap and through the first end. A voice coil 64 is wrapped around at least part of the magnetic flux conductor 62 for conducting a current to generate a second magnetic flux such that at least part of the second magnetic flux is within the air gap for interacting with the first magnetic flux.

The voice coil 64 is attached to the actuator arm 54 using any suitable technique, such as a plastic over mold or adhesive, and the magnetic flux conductor 62, including the low reluctance end, is formed from any suitable material (e.g., steel) for conducting the magnetic flux generated by the first magnet 60. The high reluctance end in the embodiment of FIG. 4 comprises air, but it may comprise any suitable material, such as plastic.

Figure 5A:
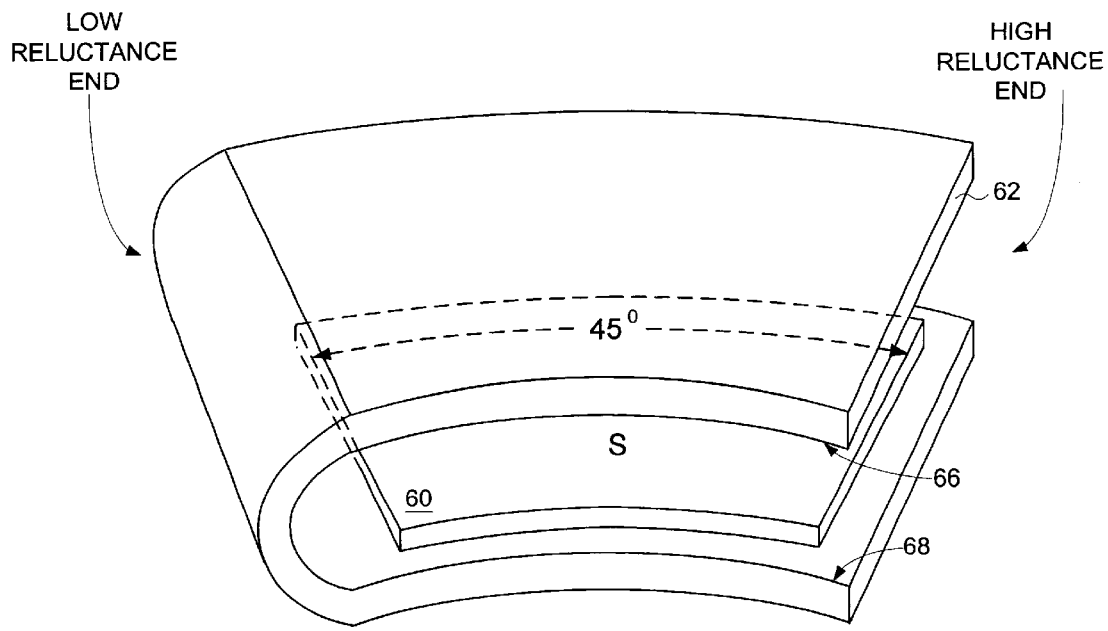
FIG. 5A shows further details of the rotary voice coil yoke of FIG. 4 as comprising a single piece of metal and a first magnet, wherein the metal is shaped to form an air gap with respect to the first magnet.

FIG. 5A shows a perspective view of the rotary voice coil yoke of FIG. 4 which shows further details of the low reluctance end and the high reluctance end of the magnetic flux conductor 62. In the embodiment of FIG. 5A, the magnetic flux conductor 62 is substantially C shaped comprising a top prong 66 and a bottom prong 68, wherein the first magnet 60 is attached to the bottom prong and the voice coil 64 of FIG. 4 is wrapped around the top prong 66. In alternative embodiment, the first magnet 60 is attached to the top prong 66 and the voice coil 64 of FIG. 4 is wrapped around the bottom prong 68.

Figure 1:
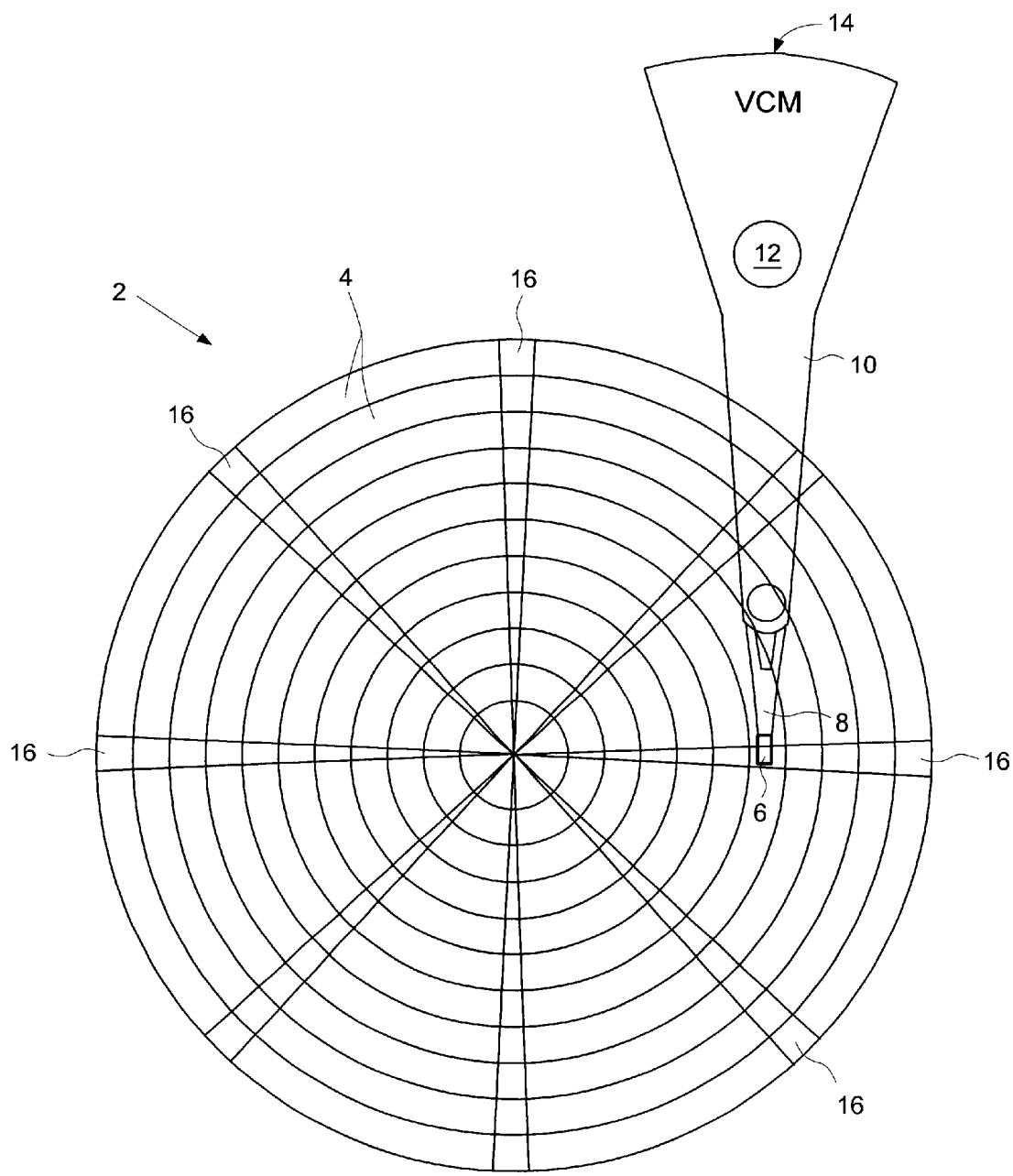
FIG. 1 shows a prior art disk drive comprising a disk, an actuator arm comprising a head attached to a distal end, and a voice coil motor for actuating the actuator arm to position the head radially over the disk.
Figure 2A:
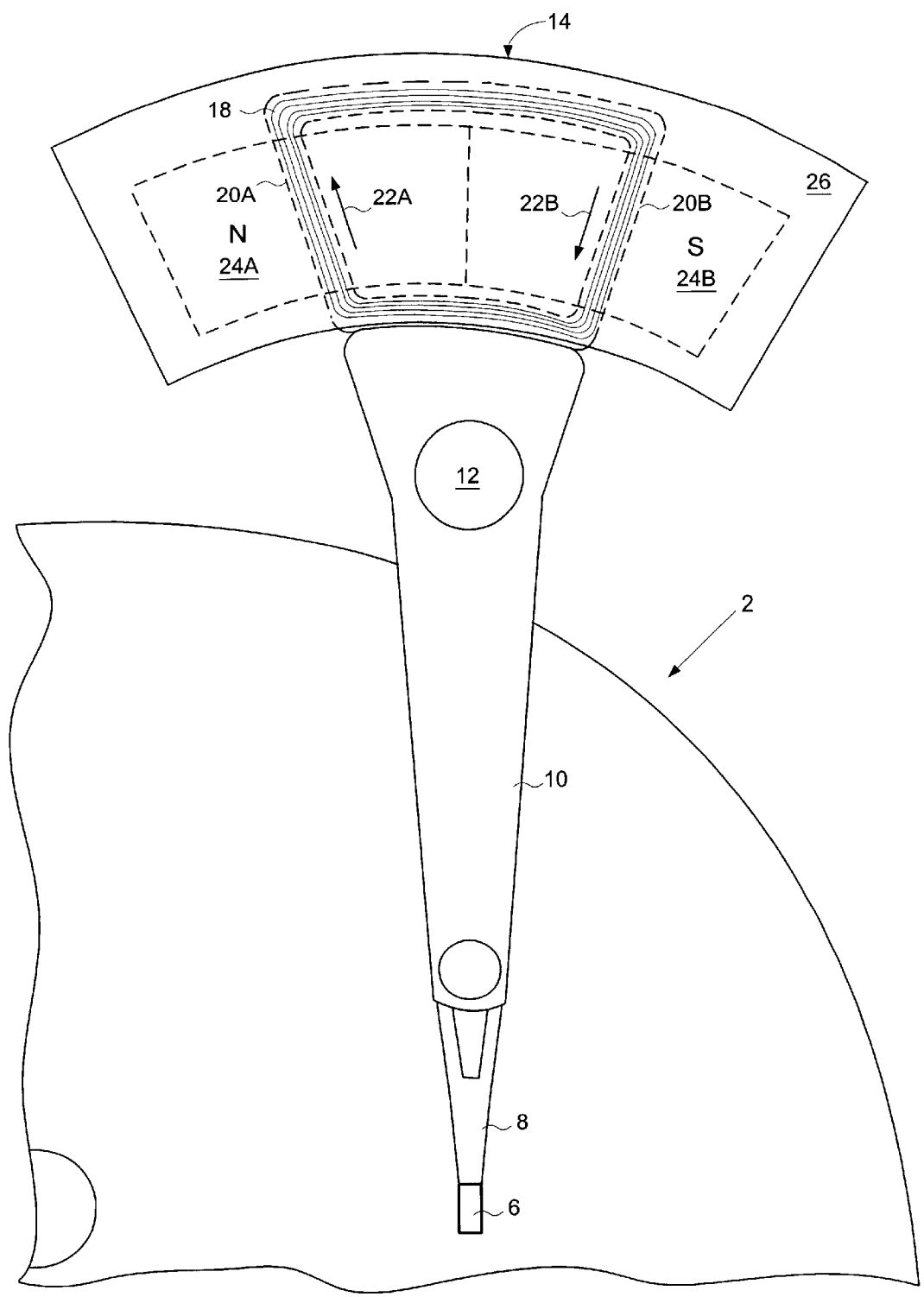
FIG. 2A shows a prior art voice coil motor comprising a trapezoidal voice coil interacting with magnets inside a rotary voice coil yoke.
Figure 2B:
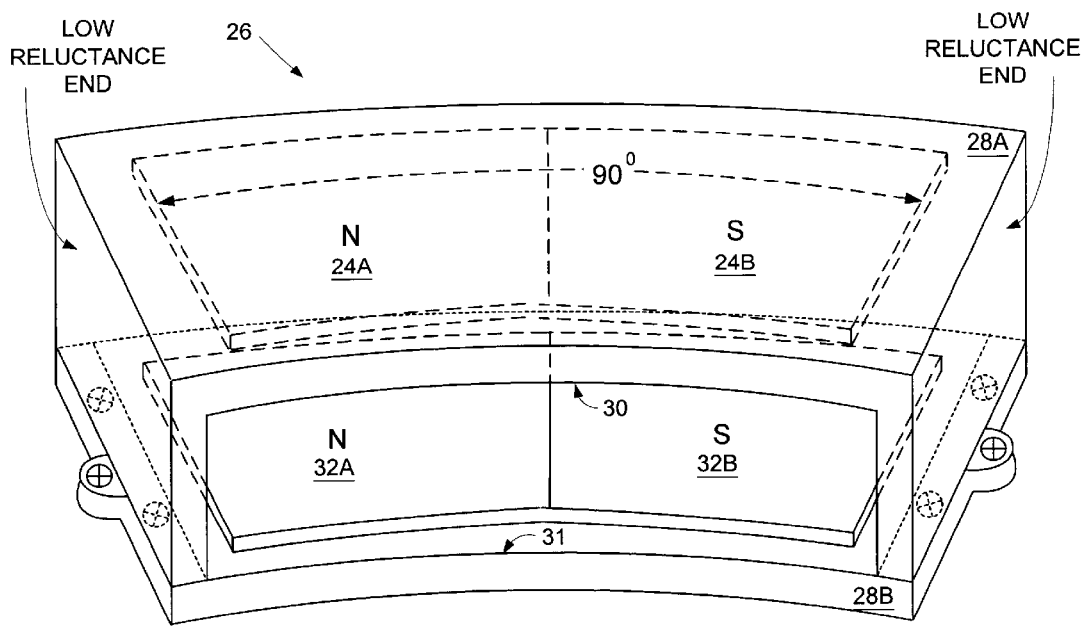
FIGS. 2B and 2C show further details of the conventional rotary voice coil yoke of FIG. 2A, including the top and bottom magnets for generating a multidirectional magnetic flux which interacts with both sides of the trapezoidal voice coil in order to rotate the actuator arm about a pivot.
Figure 2C:
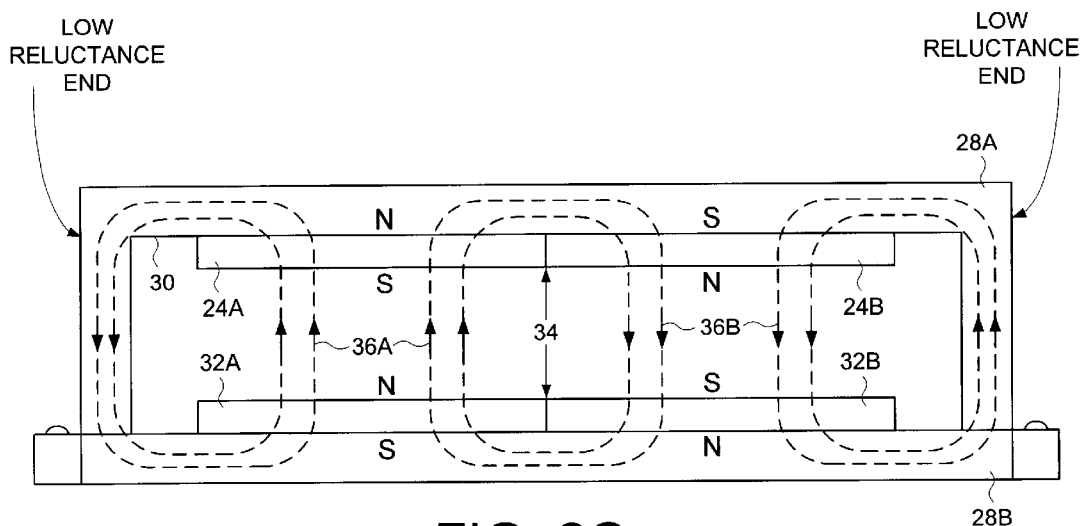
Figure 5B:
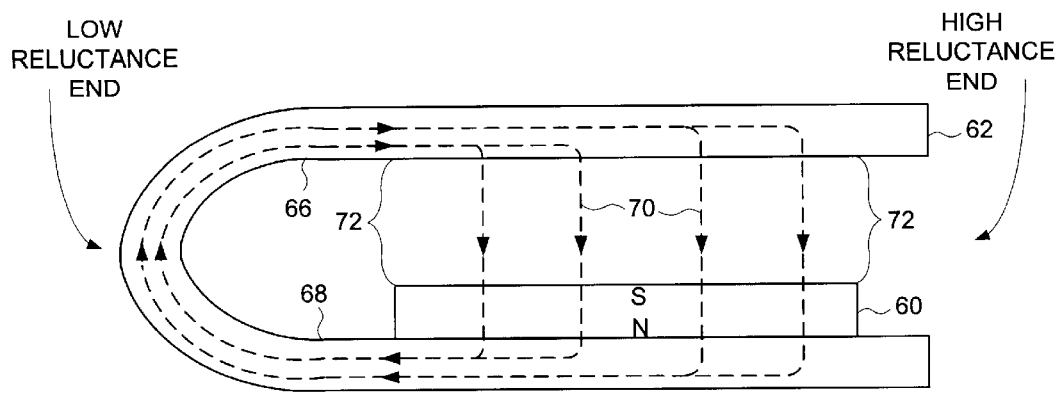
FIG. 5B illustrates the first magnetic flux generated by the magnet attached to the rotary voice coil yoke of FIG. 5A.

FIG. 5B illustrates the first magnetic flux 70 generated by the first magnet 60, wherein the magnetic flux conductor 62 guides the first magnetic flux 70 through the air gap 72 and through the low reluctance end. Note that in this embodiment, the first magnetic flux 70 generated by the first magnet 60 is unidirectional as compared to the bi-directional magnetic fluxes 36A and 36B generated by the two-magnet prior art design of FIG. 2C.

Figure 3A:
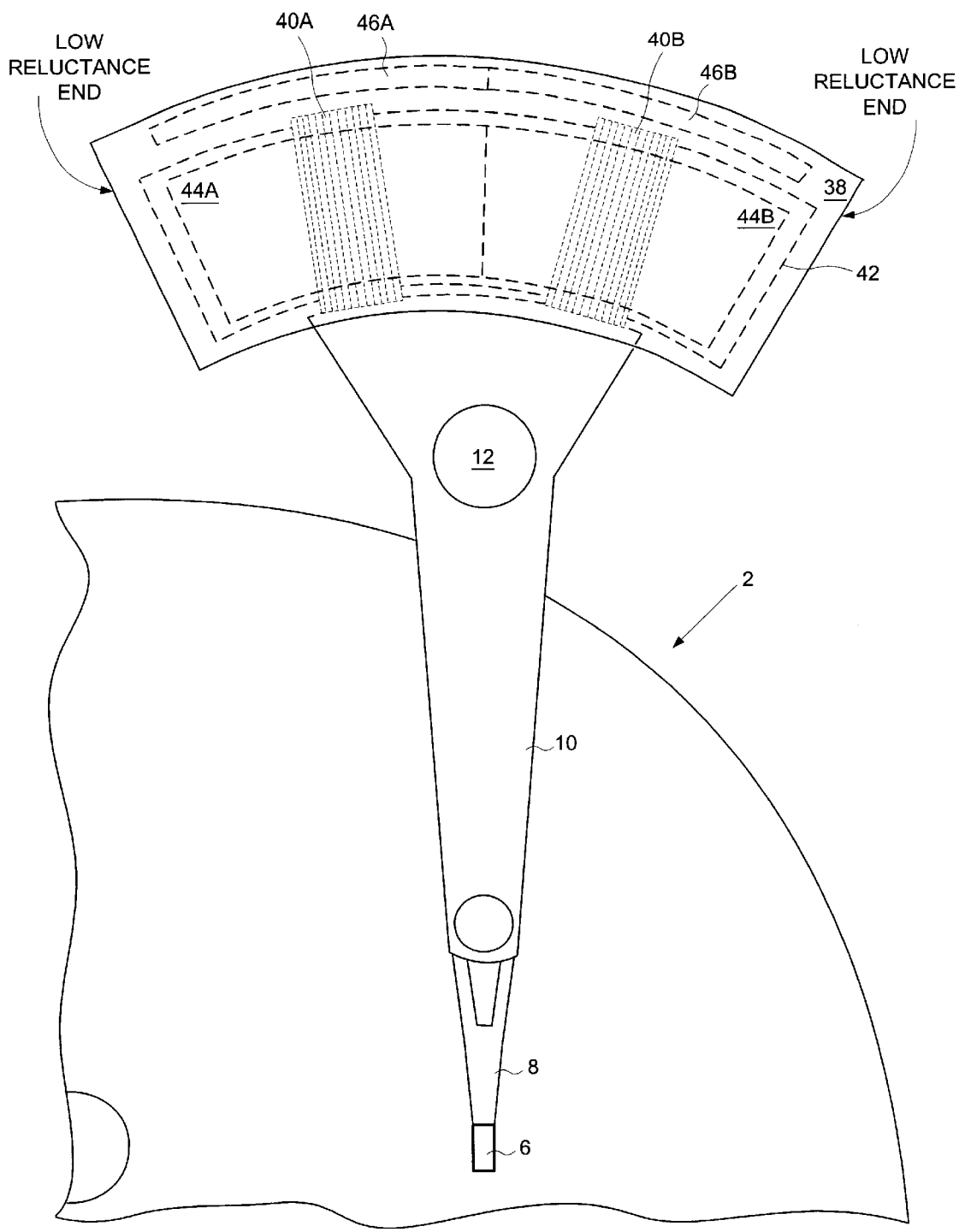
FIG. 3A shows another prior art voice coil motor wherein a first and second voice coil are wrapped around a middle conductor within a closed-ended yoke.
Figure 3B:
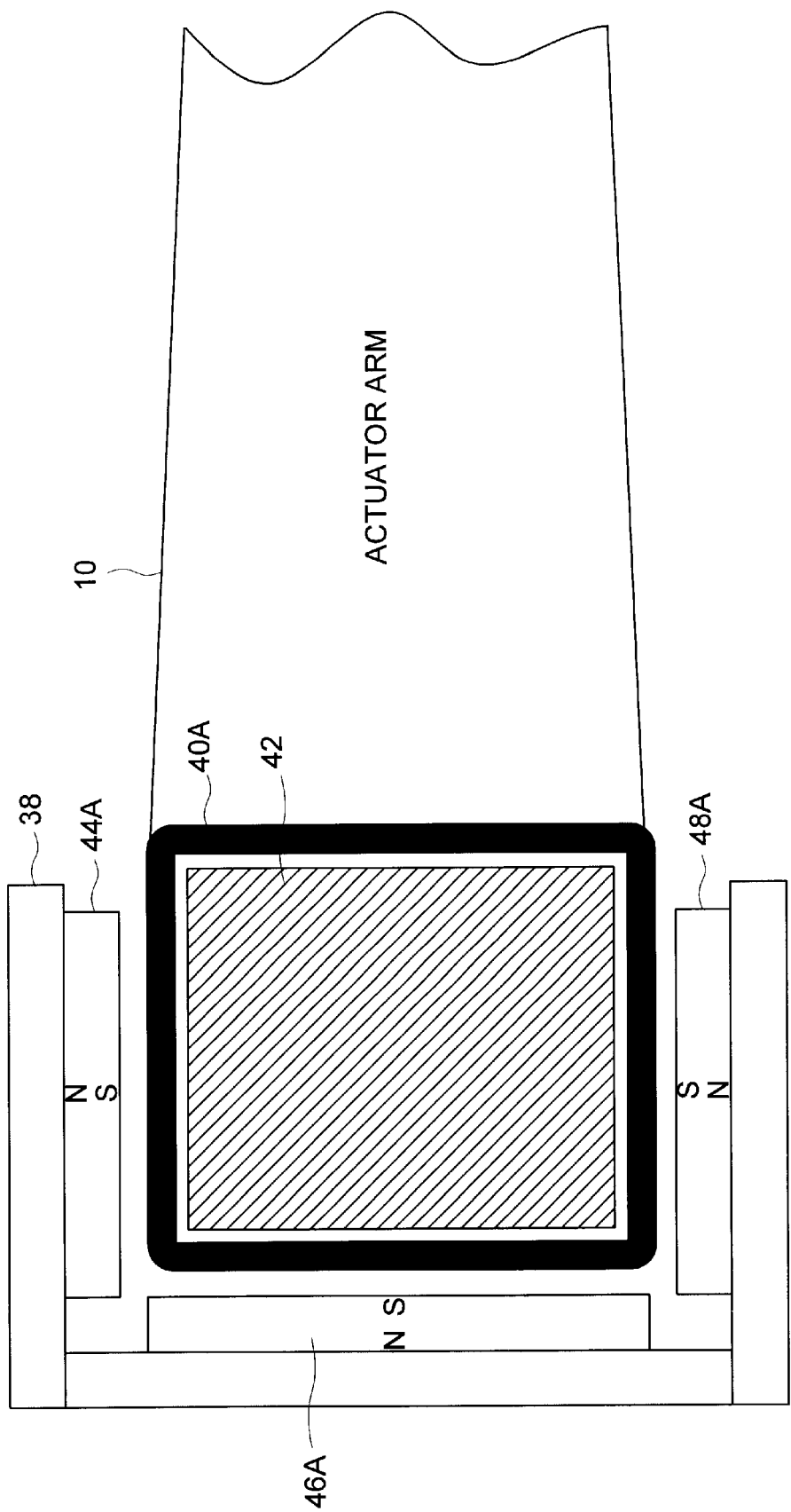
FIG. 3B shows a plane view of the prior art closed-ended yoke of FIG. 3A.
Figure 6:
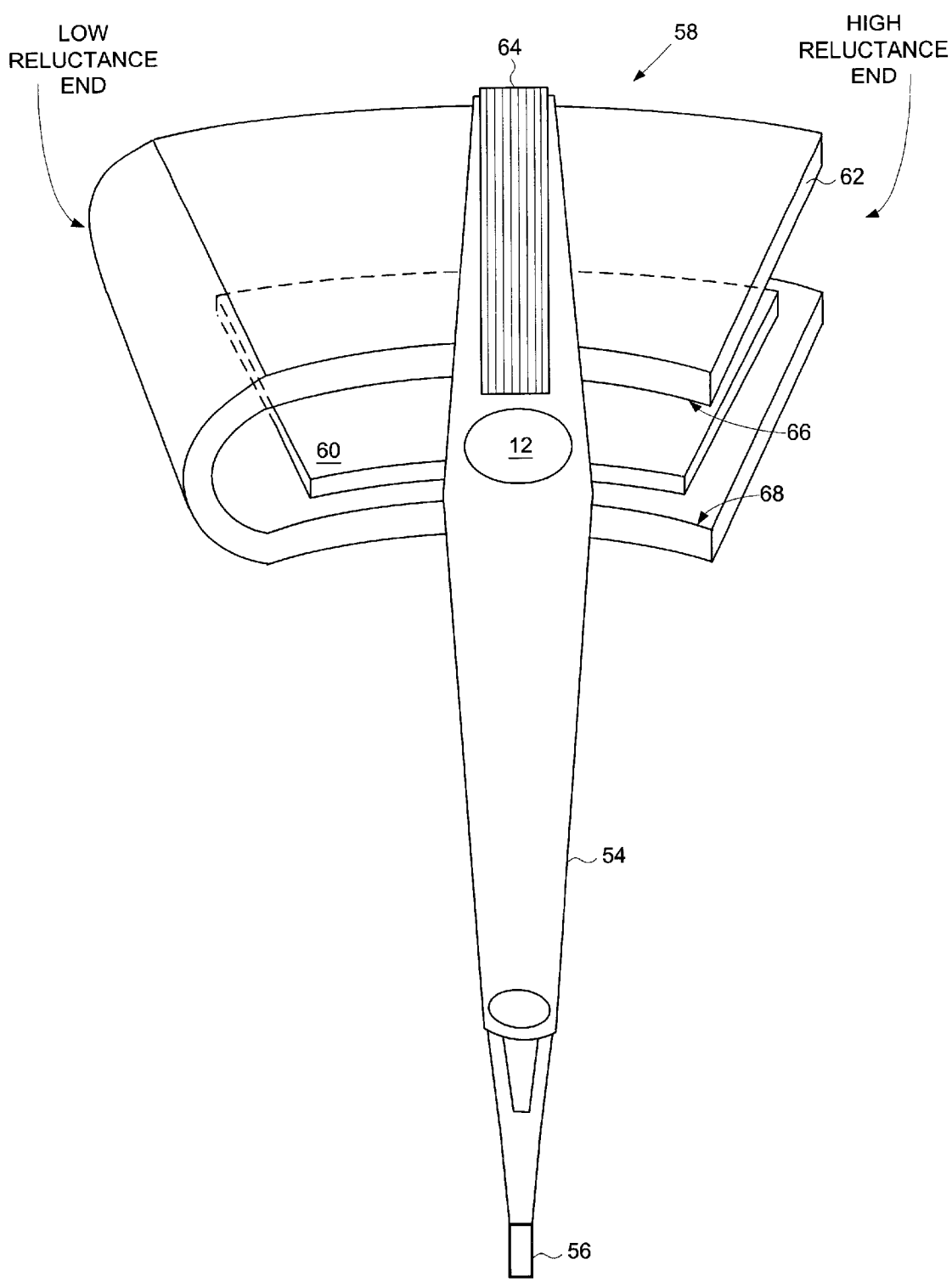
FIG. 6 shows a perspective view of the voice coil wrapped around the top prong of a substantially C shaped magnetic flux conductor.
Figure 7A:
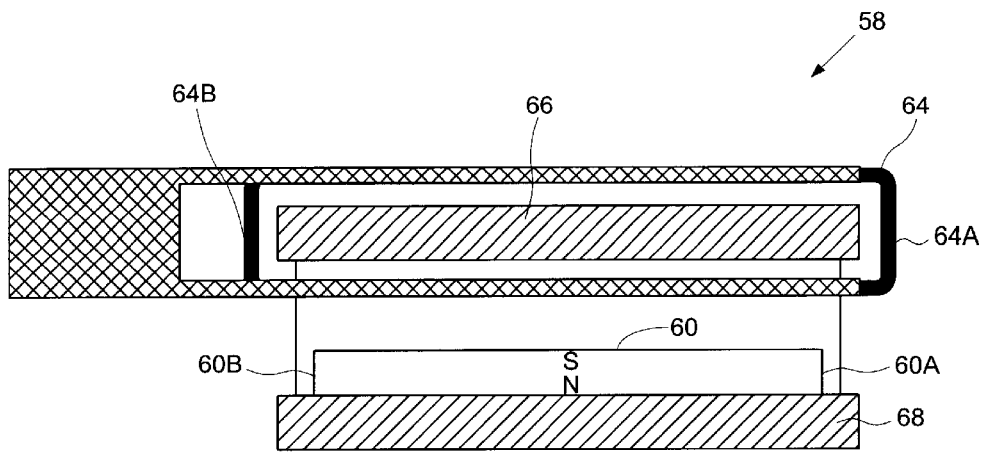
FIG. 7A shows a plane view of the voice coil wrapped around the top prong of the C shaped magnetic flux conductor of FIG. 6.

FIG. 6 shows a perspective view of the voice coil motor 58 of FIG. 4 wherein the voice coil 64 is wrapped around the top prong 66 of the substantially C shaped magnetic flux conductor 62, and FIG. 7A illustrates a plane view of the voice coil motor 58. In this embodiment, the stray flux emanating from the top side 60A and the bottom side 60B of the first magnet 60 interact constructively with the top side 64A and bottom side 64B of the voice coil 64, thereby avoiding the resonance excitation problems inherent in the prior art voice coil motor of FIG. 2A. In addition, the stray flux increases the torque of the voice coil motor 58, thereby decreasing seek times. Further, the embodiment of FIG. 7A requires only one magnet which reduces the cost of the voice coil motor as compared to the top and bottom magnets employed in the prior art designs of FIG. 2A and 3A. Still further, the high reluctance end of the magnetic flux conductor 62 reduces the inductance of the voice coil 64 as compared to the prior art closed-ended design of FIG. 3A where both ends have low reluctance for guiding the magnetic flux. This improves performance (e.g., decreases seek times) by decreasing the rise time of the current induced in the voice coil 64, thereby decreasing the rise time of the magnetic, flux generated by the voice coil 64.

In one embodiment, the magnetic flux conductor. 62 is formed from a single piece of metal which reduces the disk drive's manufacturing time and expense. The single piece of formed metal (e.g., a C shaped metal) can be massed produce independent of the disk drive. During manufacturing, the magnetic flux conductor 62 is attached to the base of the disk drive and the actuator arm 54 attached to the pivot 12. The actuator arm 54 is then rotated into position such that the top prong 66 of the magnetic flux conductor 62 is threaded through the voice coil 64.

In one embodiment, after inserting the voice coil 64 into the voice coil motor an additional piece of metal is attached to the top prong of the C shaped at the high reluctance end in order to reduce saturation by bleeding excessive flux from the top prong. In this embodiment, a gap or a piece of high reluctance material, such as a piece of plastic, separates the additional piece of metal from the bottom prong, thereby retaining the inductive reducing characteristic.

Figure 7B:
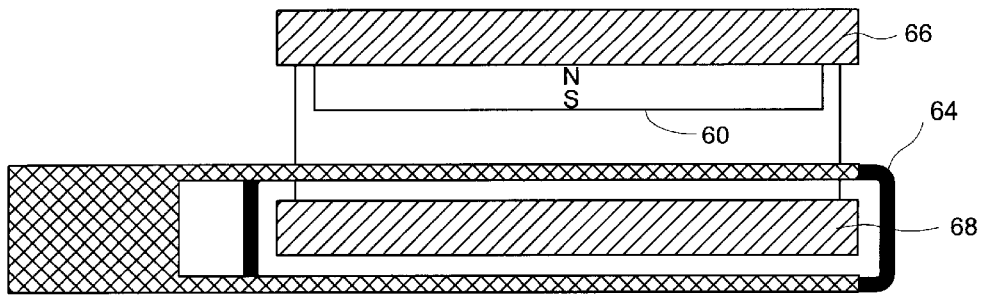
FIG. 7B shows a plane view of the voice coil wrapped around the bottom prong of the C shaped magnetic flux conductor of FIG. 6.

FIG. 7B shows an embodiment of the present invention wherein the voice coil 64 is wrapped around the bottom prong 68 of the C shaped magnetic flux conductor 62. In this embodiment, the first magnet 60 is attached to the inner side of the top prong 66. Allowing the voice coil 64 to be wrapped either around the top prong 66 or the bottom prong 68 provides a certain degree of design flexibility with respect to the vertical location of the actuator arm 54 and the vertical profile of the disk drive.

Figure 7C:
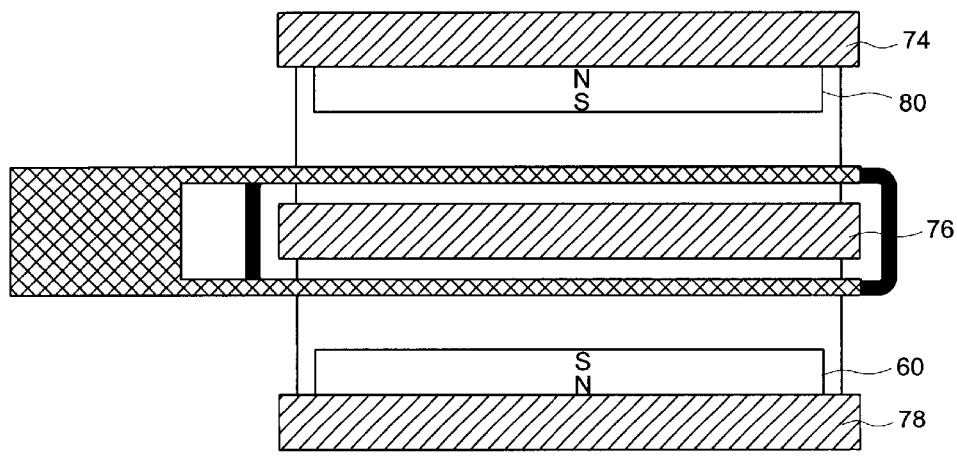
FIG. 7C shows an alternative embodiment of the present invention wherein the magnetic flux conductor comprises a substantially E shape comprising a top prong, a middle prong, and a bottom prong. The voice coil is wrapped around the middle prong, and a first and second magnet are attached to the inner sides of the top and bottom prongs.

FIG. 7C shows an alternative embodiment of the present invention wherein the magnetic flux conductor 62 comprises a substantially E shape comprising a top prong 74, a middle prong 76, and a bottom prong 78. The voice coil 64 is wrapped around the middle prong 74, the first magnet is attached to the bottom prong 78, and a second magnet 80 is attached to the top prong 74. The magnetic field induced by the first magnet 60 interacts with the magnetic field induced by the bottom leg of the voice coil 64, and the magnetic field induced by the second magnet 80 interacts with the magnetic field induced by the top leg of the voice coil 64. This increases the efficiency of the motor by using more of the voice coil 64 to generate torque, whereas with the prior art design of FIG. 2A the top and bottom legs of the voice coil 18 are used only as a return path for the current.

I claim:

1. A disk drive comprising:

(a) a disk;

(b) an actuator arm comprising a head; and (c) a voice coil motor for actuating the actuator arm to position the head radially over the disk, the voice coil motor comprising:

i a first magnet for generating a first magnetic flux;

ii a rotary voice coil yoke comprising a magnetic flux conductor shaped to form an air gap with respect to the first magnet, the magnetic flux conductor comprising a first end having a first reluctance and a second end having a second reluctance, wherein the first reluctance is substantially lower than the second reluctance such that the magnetic flux conductor guides the first magnetic flux through the air gap and through the first end; and iii a voice coil wrapped around at least part of the magnetic flux conductor for conducting a current to generate a second magnetic flux such that at least part of the second magnetic flux is within the air gap for interacting with the first magnetic flux.

2. The disk drive as recited in claim 1, wherein:
(a) the first end is physically closed; and
(b) the second end is physically open.

3. The disk drive as recited in claim 2, wherein:
(a) the magnetic flux conductor comprises a substantially C shape comprising a top prong and a bottom prong; and
(b) the voice coil is wrapped around the top prong of the C shape.

4. The disk drive as recited in claim 3, wherein the first magnet is attached to the bottom prong of the C shape.

5. The disk drive as recited in claim 2, wherein:
(a) the magnetic flux conductor comprises a substantially C shape comprising a top prong and a bottom prong; and
(b) the coil is wrapped around the bottom prong of the C shape.

6. The disk drive as recited in claim 5, wherein the first magnet is attached to the top prong of the C shape.

7. The disk drive as recited in claim 2, wherein:
(a) the magnetic flux conductor comprises a substantially E shape comprising a top prong, a middle prong, and a bottom prong; and
(b) the voice coil is wrapped around the middle prong of the E shape.

8. The disk drive as recited in claim 7, wherein:
(a) the voice coil motor comprises a second magnet for generating a second magnetic flux;
(b) the first magnet is attached to the top prong of the E shape; and
(c) the second magnet is attached to the bottom prong of the E shape.

9. The disk drive as recited in claim 1, wherein the magnetic flux conductor is formed from a single piece of metal.

10. The disk drive as recited in claim 1, wherein the first magnet flux is unidirectional.

11. A rotary voice coil yoke for use in a voice coil motor, the rotary voice coil yoke comprising a magnetic flux conductor shaped to form an air gap with respect to a first magnet, wherein:
(a) the first magnet for generating a first magnetic flux;
(b) the magnetic flux conductor comprising a first end having a first reluctance and a second end having a second reluctance; and
(c) the first reluctance is substantially lower than the second reluctance such that the magnetic flux conductor guides the first magnetic flux through the air gap and through the first end.

12. The rotary voice coil yoke as recited in claim 11, wherein:
(a) the first end is physically closed; and
(b) the second end is physically open.

13. The rotary voice coil yoke as recited in claim 11, wherein the magnetic flux conductor is formed from a single piece of metal.

14. The rotary voice coil yoke recited in claim 12, wherein the magnetic flux conductor comprises a substantially C shape comprising a top prong and a bottom prong.

15. The rotary voice coil yoke as recited in claim 14, wherein the bottom prong of the C shape is for attaching the first magnet.

16. The rotary voice coil yoke recited in claim 14, wherein the t op prong of the C shape is for attaching the first magnet.

17. The rotary voice coil yoke as recited in claim 12, wherein the magnetic flux conductor comprises a substantially E shape comprising a top prong, a middle prong, and a bottom prong.

18. The rotary voice coil yoke as recited in claim 17, wherein:
(a) a second magnet generates a second magnetic flux;
(b) the top prong of the E shape is for attaching the first magnet; and
(c) the bottom prong of the E shape is for attaching the second magnet.

19. The rotary voice coil yoke as recited in claim 12, wherein the first magnet flux is unidirectional.

* * * * *